March 2, 1965     F. M. SHETLER     3,171,351
AIR CONTROL SYSTEM FOR LIQUID TANKS
Filed Aug. 30, 1962
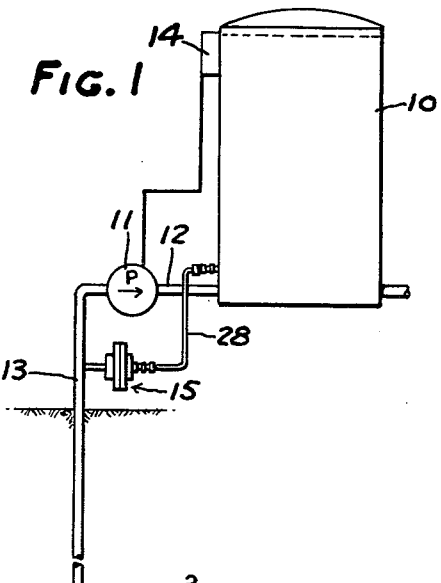
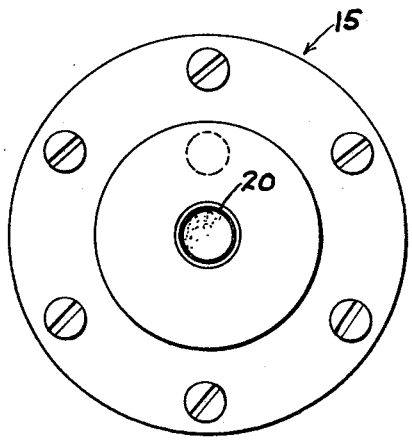
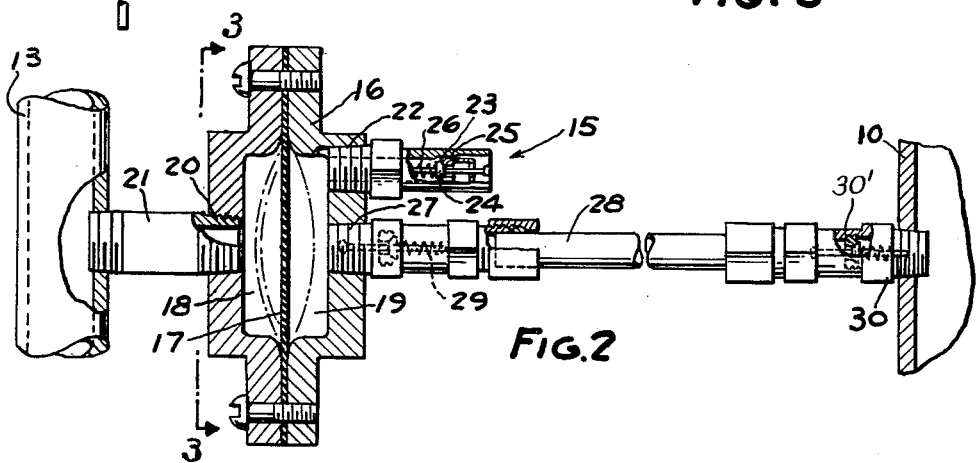
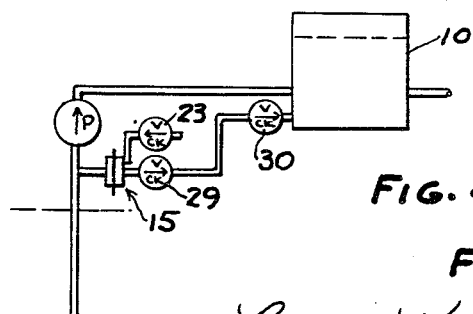
INVENTOR.
FRANCIS M. SHETLER
BY
Barnes, Kisselle, Raisch & Choate
ATTORNEYS under cover of United States Patent Office 3,171,351
Patented Mar. 2, 1965

3,171,351
AIR CONTROL SYSTEM FOR LIQUID TANKS
Francis M. Shetler, % Flint Pump & Equipment Co.,
G-3289 Flushing Road, Flint 4, Mich.
Filed Aug. 30, 1962, Ser. No. 220,474
8 Claims. (Cl. 103—6)

This invention relates to air control systems for liquid tanks and particularly to such systems for controlling the addition of air in a water storage tank.

In water storage tanks such as used in home and industry wherein the water is periodically removed from the tank and periodically replenished by operation of a pump, it is necessary to also replenish the air supply above the water in the tank to maintain the pressure on the water and thereby insure proper flow of the water out of the tank. It has heretofore been proposed to provide a system wherein air is introduced to the tank every time the pump is operated. This is done by introducing the air at a high pressure into the tank.

It is an object of this invention to provide an air control system for periodically introducing a measured quantity of air into the liquid storage tank.

It is a further object of the invention to provide such a system wherein the air is introduced into the tank when the pressure in the tank is low.

It is a further object of the invention to provide such a system which is simple and inexpensive.

Basically, the air control system embodying the invention comprises a housing with a shiftable member such as a diaphragm therein which defines two chambers. One chamber is connected to the intake of the pump and the other chamber has a passage communicating to the atmosphere. A first one-way check valve in the passage controls the flow of air into the second chamber but prevents the flow of air out of the second chamber. In addition, a cycle or storage chamber, in the form of a conduit or tube, is provided in communication with the other side of the second chamber. A second one-way check valve at one end of the cycle tube permits flow from the second chamber into the cycle tube and a one-way valve at the other end of the cycle tube permits flow of air out of the cycle tube into the tank. In operation, when the pump begins to operate, suction on the pump causes a flexing of the diaphragm with the resultant drawing of air through the first check valve into the second chamber adjacent the other side of the diaphragm. When pessure is built up in the tank and the pump stops, the diaphragm is caused to flex in the opposite direction forcing the air out of the second chamber and through the second check valve into the cycle tube. Subsequently, when the pressure in the tank again drops because of withdrawal of liquid, the air flows from the cycle tube through the third check valve into the tank.

In the drawings:

FIG. 1 is a side elevation of an air control system embodying the invention.

FIG. 2 is a part sectional view on an enlarged scale of a portion of the system.

FIG. 3 is an end view taken along the line 3—3 in FIG. 2.

FIG. 4 is a schematic diagram of the air control system.

Referring to the drawings, as shown in FIG 1, a liquid storage tank 10, such as a water tank, is supplied with liquid by a pump 11, such as a centrifugal pump, through a supply pipe 12, the pump receiving the liquid through an intake pipe 13. The pump is operable periodically as the level in the tank 10 changes in accordance with any well-known level control system, herein shown schematically as 14, which is responsive to the pressure or level of the liquid in the tank 10. An air control device 15 is interposed between the intake line 13 and the tank 10.

As shown in FIG. 2, the air control system 15 comprises a separable hollow housing 16 which has a flexible diaphragm 17 clamped therebetween to define a first chamber 18 and a second chamber 19. First chamber 18 communicates through a passage 20 and pipe 21 with the intake pipe 13.

Second chamber 19 communicates with the atmosphere through a passage 22. A first one-way check valve 23 is positioned in the passage 22 and permits the flow of air from the atmosphere into the second chamber 19 but prevents the flow of air from the second chamber 19 to the atmosphere. As shown, first check valve 23 comprises a valve member 24 that is yieldingly held against a seat 25 by a spring 26.

A second passage 27 provides communication between second chamber 19 and the interior of a storage or cycle pipe 28 which defines a cycle chamber. A second one-way check valve 29 is provided to control the flow of air to a cycle conduit or tube 28, permitting the flow of air from the second chamber 19 into cycle tube 28 but preventing the flow of air from the cycle tube 28 into the second chamber 19. A third one-way check valve 30 of similar construction is provided in the passage 30' adjacent the other end of the cycle tube 28 which is connected to the storage tank 10.

In operation, when the level of the liquid in the tank 10 goes below a predetermined level, the pump 11 is energized and operates to supply additional liquid to the tank. When the pump 11 begins to operate, the suction caused by the pump 11 flexes the diaphragm 17 to the left, as shown in FIG. 2, into the first chamber 18 causing air to be drawn through the check valve 23 into the second chamber 19. When the proper liquid level has been reached in the tank 10 and the pump 11 stops, the pressure of liquid in the tank causes the diaphragm 17 to flex in the opposite direction or to the right, as shown in FIG. 2, forcing the air in second chamber 19 through the check valve 29 into the cycle tube 28. The air is prevented from flowing into the tank 10 by the high pressure in the tank. However, as the pressure in the tank diminishes, the pressure of air in cycle tube 28 opens check valve 30 permitting the air from the cycle chamber defined by cycle tube 28 to flow into the tank 10. Upon subsequent cycling and operation of the pump, successive charges of air are introduced into the tank.

It is believed that the operation of the air control system can be better understood by a specific example. Assuming that the pump has been set to operate when the pressure in tank 10 drops to 20 pounds pressure and turn off when the pressure in tank 10 reaches 40 pounds pressure, in each cycle, the pump will begin to operate at 20 pounds pressure, drawing air into the second chamber 19 by the flexing of the diaphragm 17 and the pump will stop when the pressure in tank 10 reaches 40 pounds pressure. When the pump stops, the diaphragm 17 will be reversely flexed by the pressure forcing the air out of second chamber 19 into the cycle tube 28. When the pressure in the tank 10 drops, for example, to 25 pounds, the valve 30 is opened by the pressure of air in the cycle tube 28 so that the air passes from cycle tube 28 into the tank 10.

It can thus be seen that there has been provided an air control system which is operable to supply successive charges of air to the tank; which supplies the air to the tank when the tank is at low pressure; which is simple; and which is relatively inexpensive.

I claim:

1. In an air control system for liquid tanks, the combination comprising
a tank for storing liquid, a pump operable periodically for replenishing the liquid in the tank,
means, defining a hollow housing,
a shiftable member in said housing dividing said housing into a first chamber and a second chamber and operable by change in pressure on opposite sides thereof,
means connecting said first chamber with the intake side of said pump,
a first passage connecting said second chamber with the atmosphere,
a first valve positioned in said last-mentioned communication to permit air from the atmosphere to flow inwardly into said second chamber but prevent air from flowing outwardly from said second chamber to the atmosphere,
a second passage from said second chamber,
means defining a cycle chamber communicating with the second chamber through said second passage,
a second valve positioned in said second passage and permitting flow of air from said second chamber to said cycle chamber but preventing the flow of air from said cycle chamber to said second chamber,
a third passage connecting said cycle chamber with said tank,
and a third valve positioned adjacent said third passage to said tank and permitting the flow of air from said cycle chamber to said tank but preventing the flow of liquid or air from said tank to said cycle chamber, such that when the pump begins to operate, suction on the pump causes said shiftable member to move with a resultant drawing in of air through the first check valve into the second chamber, when the pressure is built up in the tank and the pump stops, the shiftable member moves in the opposite direction forcing the air out of the second chamber and through the second check valve into the cycle chamber and subsequently when the pressure in the tank again drops because of withdrawal of liquid, the air flows from the cycle chamber through the third check valve into the tank.

2. The combination set forth in claim 1 wherein said cycle chamber comprises
a tube,
said second and third valves being provided adjacent the opposite ends of said tube, respectively.

3. In an air control system for liquid tanks, the combination comprising
a tank for storing liquid,
a pump operable periodically for replenishing the liquid in the tank,
a hollow housing,
a diaghragm in said housing dividing said housing into a first chamber and a second chamber and operable by change in pressure on opposite sides thereof,
means connecting said first chamber with the intake side of said pump,
a first passage in said housing providing communication between said second chamber and the atmosphere,
a first valve positioned in said first passage to permit air from the atmosphere to flow inwardly into said second chamber but prevent air to flow outwardly from said second chamber through said passage to the atmosphere,
a second passage from said chamber,
means defining a cycle chamber communicating with the second chamber through said second passage,
a second valve positioned in said second passage and permitting flow of air from said second chamber to said cycle chamber but preventing the flow of air from said cycle chamber to said second chamber,
a third passage connecting said cycle chamber to said tank,
and a third valve positioned adjacent said passage to said tank and permitting the flow of air from said cycle chamber to said tank but preventing the flow of liquid or air from said tank to said cycle chamber, such that when the pump begins to operate, suction on the pump causes a flexing of the diaphragm with the resultant drawing of air through the first check valve into the second chamber adjacent the other side of the diaphragm into the second chamber, when the pressure is built up in the tank and the pump stops, the diaphragm is caused to flex in the opposite direction forcing the air out of the second chamber and through the second check valve into the cycle chamber and subsequently when the pressure in the tank again drops because of withdrawal of liquid, the air flows from the cycle tube through the third check valve into the tank.

4. In an air control system for liquid tanks, the combination comprising
a tank for storing liquid,
a pump operable periodically for replenishing the liquid in the tank,
a hollow housing,
a diaphragm in said housing dividing said housing into a first chamber and a second chamber and operable by change in pressure on opposite sides thereof,
a conduit connecting said first chamber with the intake side of said pump,
a first passage in said housing providing communication between said second chamber and the atmosphere,
a first valve positioned in said first passage to permit air from the atmosphere to flow inwardly into said second chamber but prevent air to flow outwardly from said second chamber through said passage to the atmosphere,
a second passage from said second chamber,
a cycle tube connected at one end to said second passage,
a second valve positioned in said second passage and permitting flow of air from said second chamber to said cycle tube but preventing the flow of air from said cycle tube to said second chamber,
the other end of said cycle tube being connected with said tank,
and a third valve positioned in the other end of said cycle tube and permitting the flow of air from said cycle tube to said tank but preventing the flow of liquid or air from said tank to said cycle tube, such that when the pump begins to operate, suction on the pump causes a flexing of the diaphragm with the resultant drawing of air through the first check valve into the second chamber adjacent the other side of the diaphragm into the second chamber, when the pressure is built up in the tank and the pump stops, the diaphragm is caused to flex in the opposite direction forcing the air out of the second chamber and through the second check valve into the cycle tube and subsequently when the pressure in the tank again drops because of withdrawal of liquid, the air flows from the cycle tube through the third check valve into the tank.

5. For use with a tank for storing liquid and a pump operable periodically for replenishing the liquid in the tank, the combination comprising
means defining a hollow housing,
a shiftable member in said housing dividing said housing into a first chamber and a second chamber and operable by change in pressure on opposite sides thereof,
means adapted to connect said first chamber with the intake side of said pump,
a first passage in said housing extending to the exterior thereof,
a first valve positioned in said first passage to permit air from the atmosphere to flow inwardly into said second chamber but prevent air to flow outwardly from said second passage to the atmosphere, a second passage from said second chamber, means defining a cycle chamber communicating with the second chamber through said second passage, a second valve positioned in said second passage and permitting flow of air from said second chamber to said cycle chamber but preventing the flow of air from said cycle chamber to said second chamber, a third passage adapted to connect said cycle chamber communicating with said tank, and a third valve positioned adjacent said third passage and permitting the flow of air from said cycle chamber to said tank but preventing the flow of liquid or air from said tank to said cycle chamber, such that when the pump begins to operate, suction on the pump causes said shiftable member to move with a resultant drawing in of air through the first check valve into the second chamber, when the pressure is built up in the tank and the pump stops, the shiftable member moves in the opposite direction forcing the air of out the second chamber and through the second check valve into the cycle chamber and subsequently when the pressure in the tank again drops because of withdrawal of liquid, the air flows from the cycle chamber through the third check valve into the tank.

6. The combination set forth in claim 5 wherein said cycle chamber comprises a tube, said second and third valves being provided adjacent the opposite ends of said tube, respectively.

7. For use with a tank for storing liquid and a pump operable periodically for replenishing the liquid in the tank, the combination comprising a hollow housing, a diaphragm in said housing dividing said housing into a first chamber and a second chamber and operable by change in pressure on opposite sides thereof, a conduit adapted to provide communication between said first chamber and the intake side of said pump, a first passage in said housing extending to the exterior of said housing, a first valve positioned in said first passage to permit air from the atmosphere to flow inwardly into said second chamber but prevent air to flow outwardly from said second chamber to the atmosphere, a second passage from said chamber, means defining a cycle chamber communicating with the second chamber through said second passage, a second valve positioned in said second passage and permitting flow of air from said second chamber to said cycle chamber but preventing the flow of air from said cycle chamber to said second chamber, a third passage adapted to be connected with said tank, and a third valve positioned in said third passage and permitting the flow of air from said cycle chamber to said tank but preventing the flow of liquid or air from said tank to said cycle chamber, such that when the pump begins to operate, suction on the pump causes a flexing of the diaphragm with the resultant drawing of air through the first check valve into the second chamber adjacent the other side of the diaphragm into the second chamber, when the pressure is built up in the tank and the pump stops, the diaphragm is caused to flex in the opposite direction forcing the air out of the second chamber and through the second check valve into the cycle chamber and subsequently when the pressure in the tank again drops because of withdrawal of liquid, the air flows from the cycle tube through the third check valve into the tank.

8. For use with a tank for storing liquid and a pump operable periodically for replenishing the liquid in the tank, the combination comprising a hollow housing, a diaphragm in said housing dividing said housing into a first chamber and a second chamber and operable by change in pressure on opposite sides thereof, a conduit extending from said first chamber and adapted to be connected with the intake side of said pump, a first passage in said housing providing communication between said second chamber and the atmosphere, a first valve positioned in said first passage to permit air from the atmosphere to flow inwardly into said second chamber but prevent air to flow outwardly from said second chamber to the atmosphere, a second passage in said housing from said chamber, a cycle tube connected at one end to said second passage, a second valve positioned in said second passage and permitting flow of air from said second chamber to said cycle tube but preventing the flow of air from said cycle tube to said second chamber, the other end of said cycle tube adapted to be connected to said tank, and a third valve positioned adjacent the other end of said cycle tube and permitting the flow of air from said cycle tube to said tank but preventing the flow of liquid or air from said tank to said cycle tube, such that when the pump begins to operate, suction on the pump causes a flexing of the diaphragm with the resultant drawing of air through the first check valve into the second chamber adjacent the other side of the diaphragm into the second chamber, when the pressure is built up in the tank and the pump stops, the diaphragm is caused to flex in the opposite direction forcing the air out of the second chamber and through the second check valve into the cycle tube and subsequently when the pressure in the tank again drops because of withdrawl of liquid, the air flows from the cycle tube through the third check valve into the tank.

References Cited in the file of this patent

UNITED STATES PATENTS

| | | |
|---|---|---|
| 2,342,940 | Janke | Feb. 29, 1944 |
| 2,709,964 | Brady | June 7, 1955 |
| 2,916,042 | Brady | Dec. 8, 1959 |
| 2,950,684 | Bauerlein | Aug. 30, 1960 |